United States Patent
Takahashi

(10) Patent No.: US 7,396,257 B2
(45) Date of Patent: Jul. 8, 2008

(54) COMPUTER INPUT/OUTPUT (I/O) CONNECTOR ASSEMBLY HAVING A SECURITY CIRCUIT DISPOSED THEREIN

(75) Inventor: Richard J. Takahashi, Phoenix, AZ (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 148 days.

(21) Appl. No.: 11/139,423

(22) Filed: May 26, 2005

(65) Prior Publication Data

US 2006/0268507 A1 Nov. 30, 2006

(51) Int. Cl.
H01R 13/66 (2006.01)

(52) U.S. Cl. .................................. 439/620.21

(58) Field of Classification Search .............. 340/568.4, 340/568.3; 439/620.06, 620.2, 620.21, 620.23, 439/620.24, 620.25, 620.22
See application file for complete search history.

(56) References Cited

U.S. PATENT DOCUMENTS

| | | | |
|---|---|---|---|
| 5,198,806 | A | 3/1993 | Lord |
| 5,212,729 | A | 5/1993 | Schafer |
| 5,694,213 | A | 12/1997 | Gable |
| 5,754,646 | A | 5/1998 | Williams et al. |
| 6,128,741 | A | 10/2000 | Goetz et al. |
| 6,138,240 | A | 10/2000 | Tran et al. |
| 6,317,836 | B1 | 11/2001 | Goren et al. |
| 6,657,548 | B2 | 12/2003 | Dai |
| 6,678,833 | B1 | 1/2004 | Grawrock |
| 6,848,045 | B2 | 1/2005 | Long et al. |
| 7,052,329 | B2* | 5/2006 | Belopolsky et al. .... 439/620.21 |
| 2004/0003288 | A1* | 1/2004 | Wiseman et al. ............ 713/201 |
| 2005/0069135 | A1 | 3/2005 | Brickell |
| 2005/0181643 | A1* | 8/2005 | Brower et al. .............. 439/76.1 |

OTHER PUBLICATIONS

Sundeep Bajikar, Trusted Platform Module (TPM) based Security on Notebook PCs—White Paper, Mobile Platforms Group, Intel Corporation, Jun. 20, 2002.

\* cited by examiner

*Primary Examiner*—Ross N Gushi
(74) *Attorney, Agent, or Firm*—Davidson Berquist Jackson & Gowdey LLP

(57) ABSTRACT

A security circuit is disposed within the housing of an input/output (I/O) connector assembly that is configured to implement the functionality of a computer system I/O port. Thus, when the connector assembly is mounted on a computer system board the security circuit is mounted right along with the connector assembly. The I/O connector assembly includes a connector housing, an I/O connector, and the security circuit. The connector housing is adapted to mount on the computer system board. The I/O connector is disposed within the connector housing and defines a receptacle adapted to electrically couple to a peripheral device. The security circuit is disposed within the connector housing and is electrically coupled to the I/O port. The security circuit is configured to implement one or more security routines, and is transparent to the I/O functionality until it is needed to implement the security routines.

19 Claims, 4 Drawing Sheets

COMPUTER INPUT/OUTPUT (I/O) CONNECTOR ASSEMBLY HAVING A SECURITY CIRCUIT DISPOSED THEREIN

TECHNICAL FIELD

The present invention generally relates to computer security and, more particularly, to an input/output (I/O) connector assembly within which an I/O security circuit is disposed.

BACKGROUND

Recently, personal computer (PC) and computer server use, in both the home and office environments, has become widespread. This widespread use has also lead to increased concerns over data security. With the growth of the Internet, wireless communication technologies, and mobile computing, data security is becoming an ever increasing issue. For example, many PCs often operate outside of a secure firewall environment, and may periodically communicate with a network or the Internet. During such communication, a determined hacker can attack the communication channel used by the PC or server. This poses a threat not only to sensitive data resident on the PC, but also to data resident on the network, and data being transmitted between the PC and the network.

Various solutions have been proposed to address problem of data theft and hacking. One proposed solution is the use of an external device called a hardware key, or "dongle." A dongle is a device that is externally coupled to an input/output (I/O) port on a host PC. Although these devices do work satisfactorily, dongles do suffer certain drawbacks. For example, the dongle is installed in an I/O port, which prevents that port from being used for a peripheral device, such as a printer, a scanner, or other I/O devices. Alternatively, if a PC or server can verify that another PC or server in a network or the Internet is trusted to share information or data then hacking or data theft by the other computer can also be eliminated. This is because if the PC or server is not trusted, then communication between the PC or server and the non-trusted PC or server is terminated.

Yet another solution has been proposed by the Trusted Computing Platform Alliance (TCPA). Specifically, the TCPA developed a security solutions specification for a trusted platform module (TPM). A TPM is a circuit included within a computing system to support trusted computing. The TPM may be implemented as a separate integrated circuit chip that is mounted on the motherboard of a PC or server, or integrated with other circuits within the computing system such as, for example, the CPU chip set or within the CPU itself. No matter its specific physical implementation, the TPM is configured to provide various security functions. For example, the TPM typically includes a public/private key pair for cryptographic operations, can generate anonymous key pairs for use by other entities, can perform encryption and decryption operations, can sign and verify data, and can establish a root of trust.

Although quite effective in implementing trusted computing, and reducing the likelihood of secure data theft, the present instantiation of the TPM suffers certain drawbacks. For example, not all PC motherboards are presently designed and manufactured to receive a TPM, or other type of security circuit. Thus, many PC or server motherboards need to be specially designed and manufactured to receive a TPM or circuits integrated with a TPM. This can significantly increase overall manufacturing costs, which can in turn be passed on to the consumer. Moreover, a TPM, whether implemented as a stand-alone circuit or integrated into other circuits, is typically unique to a specific chip vendor, which can significantly impact manufacturing flexiblity.

Accordingly, it is desirable to provide a means of implementing a trusted computing environment that does not suffer the above-noted drawbacks. Namely, a means that does not rely on any type of externally connected device or devices and/or a means that does not rely on specially designed PC motherboards. The present invention addresses at least these needs.

BRIEF SUMMARY

An input/output (I/O) connector assembly is provided having an I/O security circuit disposed therein. In one embodiment, and by way of example only, an I/O connector assembly includes a connector housing, an I/O connector, and a security circuit. The connector housing is adapted to mount on a circuit board. The I/O connector is disposed within the connector housing and defines a receptacle adapted to electrically couple to a peripheral device. The security circuit is disposed within the connector housing and is electrically coupled to the I/O port. The security circuit is configured to implement one or more security routines.

In yet another exemplary embodiment, a circuit assembly includes a circuit board, a security circuit, and an I/O connector assembly. The security circuit is mounted on the circuit board and is configured to implement one or more security routines. The I/O connector assembly is mounted on the circuit board and is disposed at least partially over the security circuit. The I/O connector assembly includes an I/O connector that is electrically coupled to the security circuit and is adapted to electrically couple to a peripheral device.

In yet a further exemplary embodiment, a device for implementing a computer includes a circuit board, a connector housing, an I/O connector, and a security circuit. The connector housing is mounted on the circuit board. The input/output (I/O) connector is disposed within the connector housing and is adapted to couple to a peripheral device. The security circuit is at least partially disposed within the connector housing and is electrically coupled to the I/O port. The security chip is configured to perform one or more software security routines.

In still a further exemplary embodiment, a device for implementing a computer includes circuit board, a connection header, and a security circuit. The connection header is coupled to the circuit board, and the security circuit is coupled to the connection header. The security chip configured to perform one or more software security routines.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
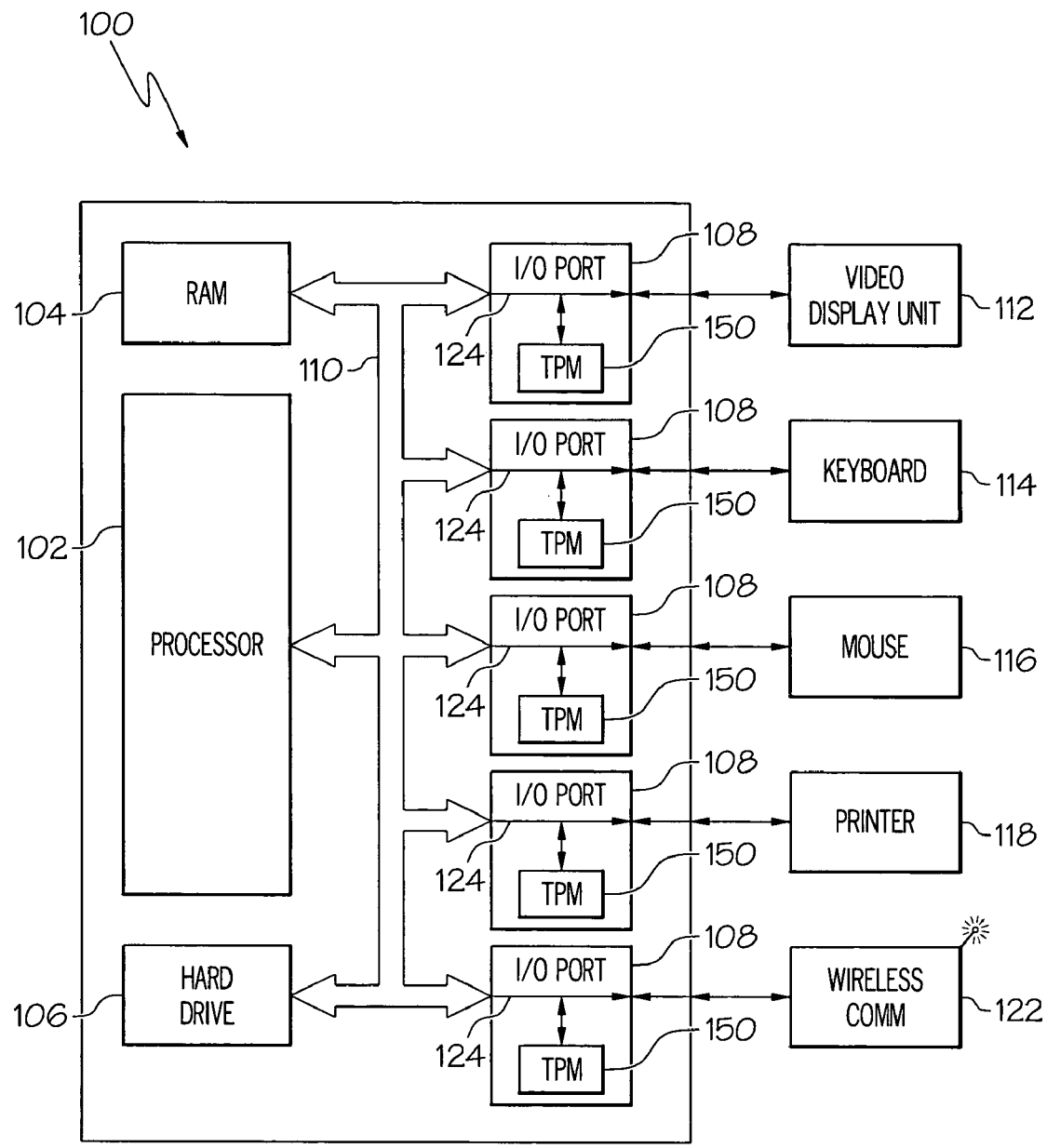
FIG. 1 is a functional block diagram of an exemplary computer according to an embodiment of the present invention.

Turning first to FIG. 1, a functional block diagram of an exemplary computer system 100 is illustrated. The computer system 100 includes, among other things, a processor 102, random access memory (RAM) 104, a hard drive 106, and a plurality of input/output (I/O) ports 108, all interconnected via one or more communication buses 110. The processor 102, which may be any one of numerous known processor devices, controls the overall operation of the computer system 100 via operating system software and various other software that is stored in the RAM 104.

The computer system 100 may be coupled to various peripheral I/O devices such as, for example, a video display unit 112, a keyboard 114, a mouse 116, a printer 118, and/or a wireless communication device 122, just to name a few. No matter the specific type and number of peripheral I/O devices that are coupled to the computer system 100, each is coupled via one of the I/O ports 108. As FIG. 1 additionally shows, each I/O port 108 has a security circuit 150 disposed therein (or at least partially disposed therein). The security circuit 150 is preferably, though not necessarily, a single integrated circuit chip that is configured to implement one or more security routines. In a particular preferred embodiment, the security circuit 150 is implemented as a trusted platform module (TPM). It will be appreciated, however, that the security circuit 150 need not be a TPM, but could be implemented as any one of numerous other circuits that implement any one of numerous security routines. It will additionally be appreciated that the computer system 100 could be implemented with the security circuit 150 disposed in only one or more selected I/O ports 108, rather than all of the I/O ports 108.

No matter the specific type and number of security circuits 150 that are used, it is seen that each security circuit 150 is electrically coupled, via the associated I/O port internal data/ control communication conductors 124, to the system communication bus 110. Thus, some or all of the data that passes through the I/O ports 108 may be subject to one or more security routines implemented by the security circuit 150. It will be appreciated that the security circuit 150 need not be electrically coupled between the I/O port communication conductors 124 and the system communication bus 110 as shown in FIG. 1. For example, in an alternate embodiment the security circuit 150 is electrically coupled in series between the I/O port communication conductors 124 and the system communication bus 110. Moreover, the security circuit 150 is configured such that it will not circumvent or interfere with the normal functionality of the I/O port 108. In other words, the security circuit 150 is configured to be transparent to the normal I/O functionality until the security circuit 150 is needed to implement the TPM function.

The I/O ports 108 may be implemented as any one of numerous types of I/O ports now known, or developed in the future, that communicate data in a parallel or serial manner. For example, the I/O ports 108 may be implemented as a network port, a modem port, a video port, a parallel port, a serial port, a PS/2 port, an IEEE 1394 port, a PC Card port (or slot), and/or a USB (universal serial bus) port, just to name a few non-limiting examples. No matter the specific type (or types) of I/O port(s) 108 that is (or are) used, each is physically implemented as a connector assembly that includes one or more connectors that are adapted to electrically couple the computer system 100 to one or more peripheral device. An exemplary embodiment of an I/O port 108 that is physically implemented using a multi-port USB connector assembly is shown in simplified form in FIG. 2, and with reference thereto will now be described.

Figure 2:
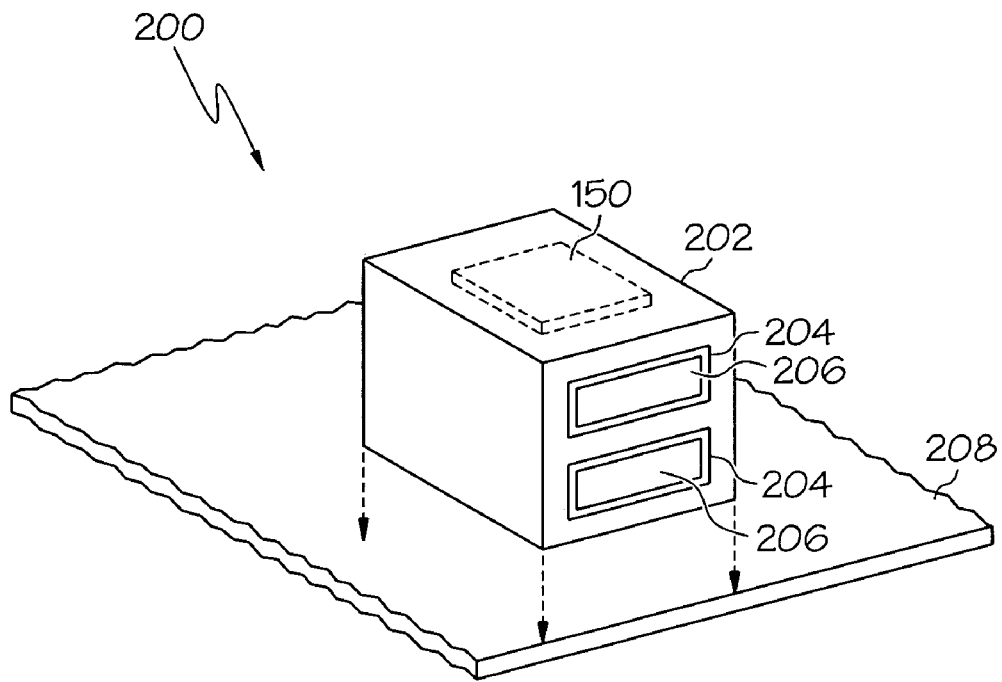
FIG. 2 is a simplified perspective view of a connector assembly according to an exemplary embodiment of the present invention that may be used in the computer of FIG. 1.

The connector assembly 200 includes a housing 202, one or more connectors 204, and the security circuit 150. In the depicted embodiment, the connector assembly 200 includes two connectors 204. It will nonetheless be appreciated that the connector assembly 200 could be implemented with only one connector 204 or with more than two connectors 204. In any case, the connector housing 202 encloses the connectors 204 and is preferably formed, or at least partially formed, of a non-conductive material, such as a non-conductive plastic. It will be appreciated that the particular shape and configuration of the connector assembly housing 202 shown in FIG. 2 is merely exemplary, and that the shape and configuration may vary with the specific type of connector assembly 200 being implemented.

Figure 3:
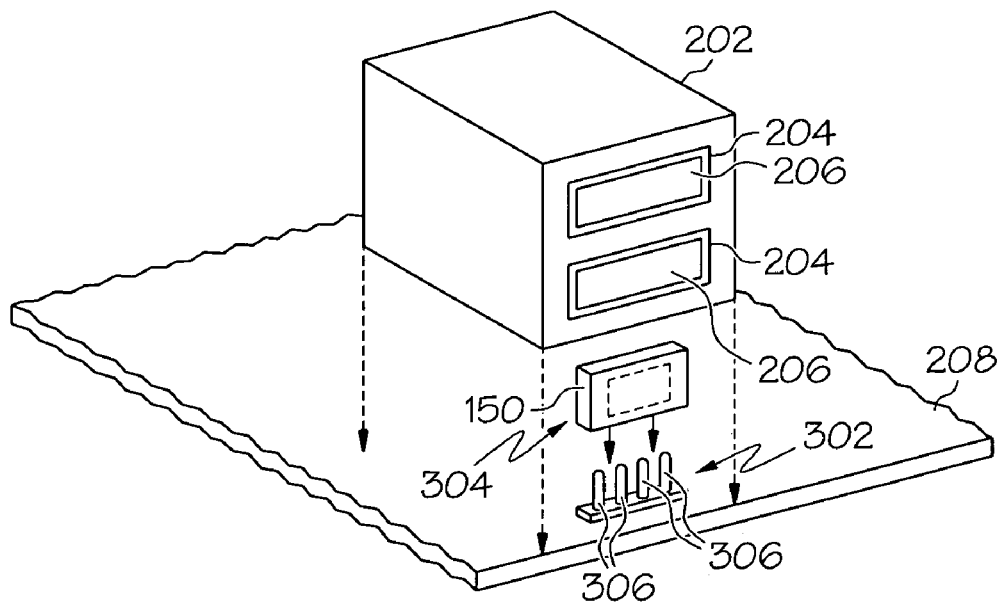
FIGS. 3-5 are simplified perspective view of a connector assembly according to exemplary alternative embodiment of the present invention that may be used in the computer of FIG. 1.
Figure 4:
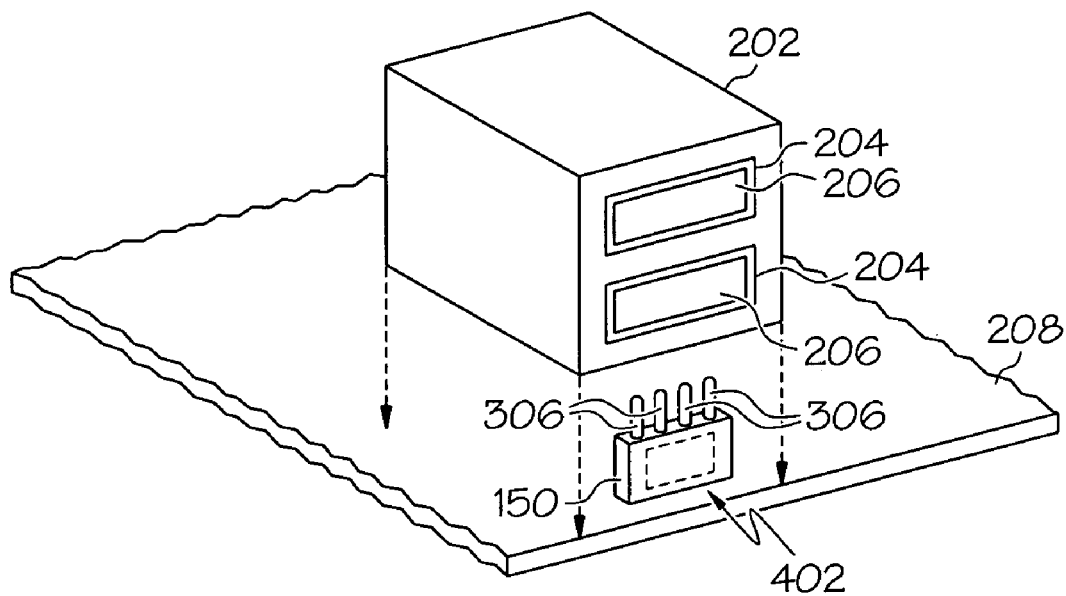
Figure 5:
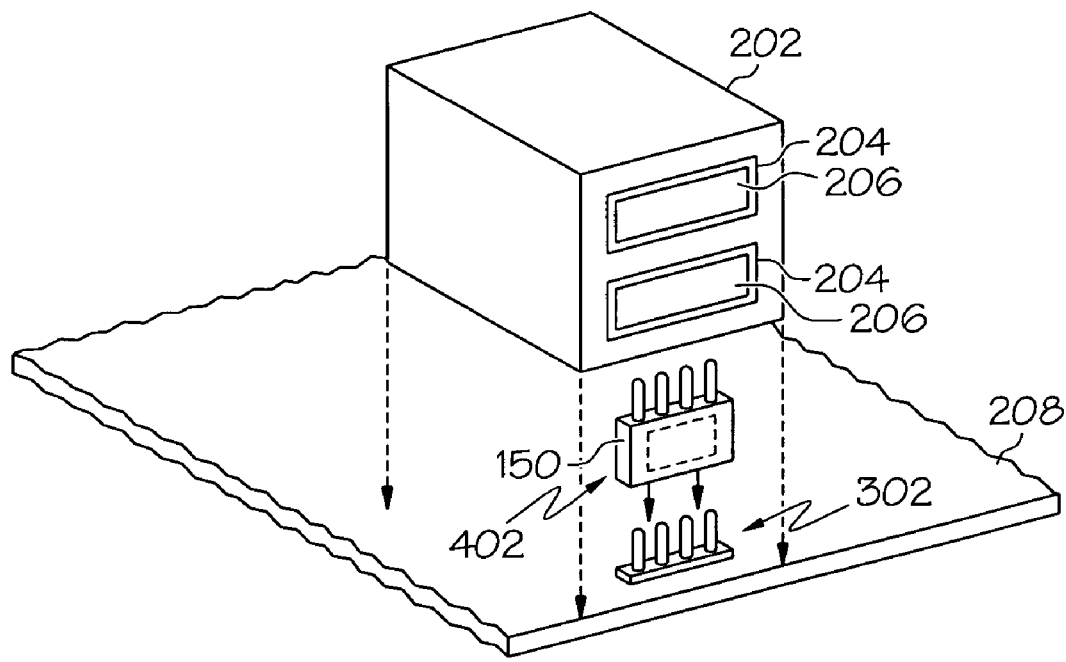

The connectors 204 each define a receptacle 206 that is adapted to electrically couple to a peripheral device. In many instances, the receptacle 206 and the associated peripheral device are electrically coupled via a cable (not illustrated) that is inserted into the receptacle 206. In the embodiment shown in FIG. 2, which is a USB connector assembly, each receptacle 206 is implemented as a resilient female slot that receives a like-dimensioned male insert (not shown). The male insert has four conductors disposed therein that are electrically coupled, one each, to four internal conductors disposed within the each receptacle 206. The four internal conductors are electrically coupled to four pins (not shown in FIG. 2) that are used to physically and electrically couple the connector assembly 200 to a computer system board 208. It will be appreciated that this connection may be accomplished either directly, as shown in FIG. 2, or via a connection header 302, as shown in FIG. 3. In the embodiment shown in FIG. 3, the security circuit 150 is disposed within, or is configured as, a female connector 304, which is electrically coupled to the connection header 302. The connection header 302 shown in FIG. 3 includes a plurality of pins 306 for electrically coupling the connector assembly 200 to the system board 208. Upon assembly, the security circuit 150 is preferably disposed within the connector housing 202, and the connector assembly 200 is electrically coupled to the connection header 302, either directly or via the female connector 304. In yet another alternative embodiment, which is shown in FIG. 4, the security circuit 150 is disposed within, or is configured as, a connection header 402, and includes the plurality of pins 306 for connection to the connector assembly 200. It will be appreciated that the connection header 402 shown in FIG. 4 may be either affixed to the system board 208 or removable therefrom. Moreover, as shown in FIG. 5, the connection header 402 may be configured to couple to the connection header 302 depicted in FIG. 3 and described above.

As is generally known, in a USB connector assembly only two of the internal conductors function as the above-referenced I/O port communication conductors 124, and the remaining two are power conductors. It will be appreciated that in other embodiments the receptacle 206 may be configured differently than the USB-type receptacle depicted in FIGS. 2-5 and described above, and may include different numbers and types of electrical conductors. For example, in other embodiments, in which the connector assembly 200 is a parallel or serial port, the receptacle 206 may include multiple pins or multiple female pin receptacles coupled to the internal I/O port communication conductors 124.

No matter the specific type of receptacle 206, or the number of internal I/O port communication conductors 124 included in the connector assembly 200, the security circuit 150 is disposed within the housing 202 and is electrically coupled to at least selected ones of the internal I/O port communication conductors 124. The specific conductors 124 to which the security circuit 150 is electrically coupled may vary, depending on the specific type of I/O port 108 that the connector assembly 200 is configured to implement. The security circuit 150 may be separately disposed within the housing 202 or it may be embedded within the housing 202 during its manufacture.

With the above-described connector assembly 200 configuration, and as additionally shown in FIGS. 2-5, when the connector assembly 200 is mounted on the computer system board 208 (as illustrated via the dashed lines in FIG. 2) the security circuit 150 is mounted right along with the connector assembly 200. Since computer system boards 208 have been, and continue to be, designed and manufactured to have connector assemblies mounted thereon, no additional expense is incurred in manufacturing the board 208, and thus no additional expense is incurred in manufacturing the overall computer system 100.

Figure 6:
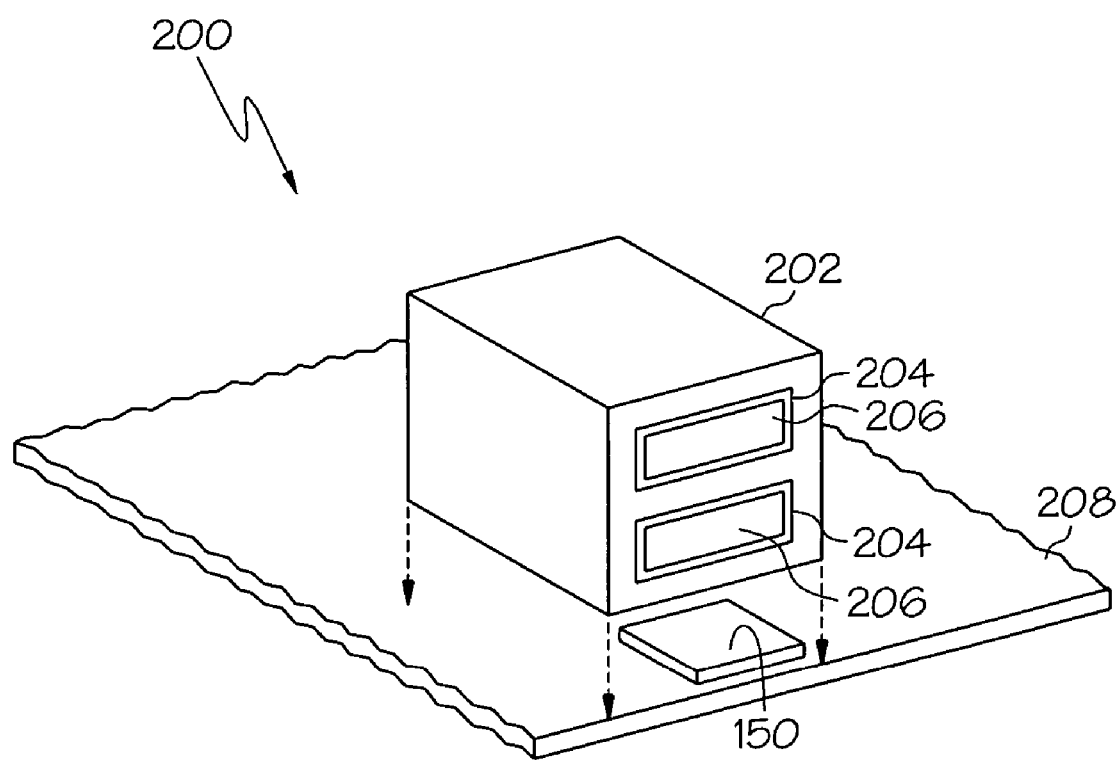
FIG. 6 is a simplified perspective view of a connector assembly according to another exemplary alternative embodiment of the present invention.

It will be appreciated that disposing the security circuit 150 within the connector assembly housing 202 during connector assembly 200 manufacture is only exemplary of one particular embodiment. In another embodiment, which is illustrated in FIG. 6, the security circuit 150 is first mounted on the system board 208 within the connector assembly footprint. Thereafter, the connector assembly 200 is mounted on the system board 208 and is electrically coupled to the security circuit 150 via, for example, feed-thru holes and solder. It will be appreciated that the security circuit 150 may be either mounted directly on the system board 208, mounted on and electrically coupled to the connector assembly 200 via one of the above-described connection headers 302, 402, or disposed wholly or partially within the connection header 212. Moreover, the security circuit 150 may be independently mated to the connection header 302, 402, whether or not it is configured as or disposed within a connection header 302, 402. Thus, the security circuit 150 is preferably configured to implement the one or more security routines whether or not the connector assembly 200 is coupled thereto.

Those skilled in the art will recognize that many modifications may be made to this configuration without departing from the scope of the present invention. For example, those skilled in the art will recognize that any combination of the above components, or any number of different components, peripherals, and other devices, may be used with the present invention. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An input/output (I/O) connector assembly, comprising:
a connector housing adapted to mount on a circuit board;
an I/O connector disposed within the connector housing, the I/O connector defining a receptacle adapted to electrically couple to a peripheral device;
a security circuit disposed within the connector housing and electrically coupled to the I/O port, the security circuit configured to implement one or more security routines;
wherein the security circuit includes a public/private key pair for cryptographic operations, a generator for generating an anonymous key pair, a module for encryption and decryption operations, and a module for signing and verifying data and establishing a root of trust.

2. The I/O connector assembly of claim 1, wherein the security circuit comprises a trusted platform module.

3. The I/O connector assembly of claim 1, wherein I/O connector is configured as a USB connector.

4. The I/O connector assembly of claim 1, wherein I/O connector is configured as serial connector.

5. The I/O connector assembly of claim 1, wherein I/O connector is configured as a parallel connector.

6. The I/O connector assembly of claim 1, wherein I/O connector is configured as a network connector.

7. The I/O connector assembly of claim 1, wherein I/O connector is configured as a PC card slot.

8. The I/O connector assembly of claim 1, wherein the I/O connector is configured as an IEEE 1394 connector.

9. The I/O connector assembly of claim 1, further comprising:
one or more communication conductors dispose within the connector housing and electrically coupled between the I/O connector and the security circuit.

10. The I/O connector assembly of claim 1, wherein the security circuit is implemented as an integrated circuit chip.

11. The device of claim 1, wherein the security circuit implements the software security routines on data arriving from the peripheral device, independently and autonomously of any data communications protocol between the peripheral device and the circuit board.

12. The device of claim 1, wherein the security circuit implements the software security routines on received communications data, free of any reliance on the peripheral device that is sending the communications data, or the circuit board that is receiving the communications data.

13. The device of claim 1, wherein the security circuit performs the software security routines, algorithms and functions on I/O communications data by independently and autonomously encrypting and decrypting the communications data from the peripheral device or the circuit board, and by using host control for configuration, set-up and control to encrypt and decrypt or authenticate, or exchange keys.

14. A device for implementing a computer, comprising:
a circuit board;
a connector housing mounted on the circuit board;
an input/output (I/O) port disposed within the connector housing and adapted to couple to a peripheral device; and
a security circuit disposed within the connector housing and electrically coupled to the I/O port, the security circuit configured perform one or more software security routines;
wherein the security circuit includes a public/private key pair for cryptographic operations, a generator for generating an anonymous key pair, a module for encryption and decryption operations, and a module for signing and verifying data and establishing a root of trust.

15. The device of claim 14, wherein the Security circuits mounted on the circuit board.

16. The device of claim 14, wherein the security circuit comprises a trusted platform module.

17. The device of claim 14, wherein the security circuit performs the software security routines on data arriving from the peripheral device, independently and autonomously of any data communications protocol between the peripheral device and the circuit board.

18. The device of claim 14, wherein the security circuit performs the software security routines on received communications data, free of any reliance on the peripheral device that is sending the communications data, or the circuit board that is receiving the communications data.

19. The device of claim 14, wherein the security circuit performs the software security routines, algorithms and functions on I/O communications data by independently and autonomously encrypting and decrypting the communications data from the peripheral device or the circuit board, and by using host control for configuration, set-up and control to encrypt and decrypt, or authenticate, or exchange keys.

* * * * *